TAIT & AVIS.
Brewer's Refrigerator.

No. 70,647. Patented Nov. 5, 1867.

United States Patent Office.

AUGUSTUS H. TAIT AND JOSEPH W. AVIS, OF NEW YORK, N. Y.

Letters Patent No. 70,647, dated November 5, 1867; antedated October 25, 1867.

---

IMPROVEMENT IN REFRIGERATORS FOR BREWERS.

---

*The Schedule referred to in these Letters Patent and making part of the same.*

---

TO ALL WHOM IT MAY CONCERN:

Be it known that we, AUGUSTUS H. TAIT and JOSEPH W. AVIS, of the city, county, and State of New York, have invented a new and improved Refrigerator; and we do hereby declare that the following is a full, clear, and exact description thereof, which will enable others skilled in the art to make and use the same, reference being had to the accompanying drawing, forming part of this specification, in which—

Similar letters of reference indicate corresponding parts.

Figure 1:
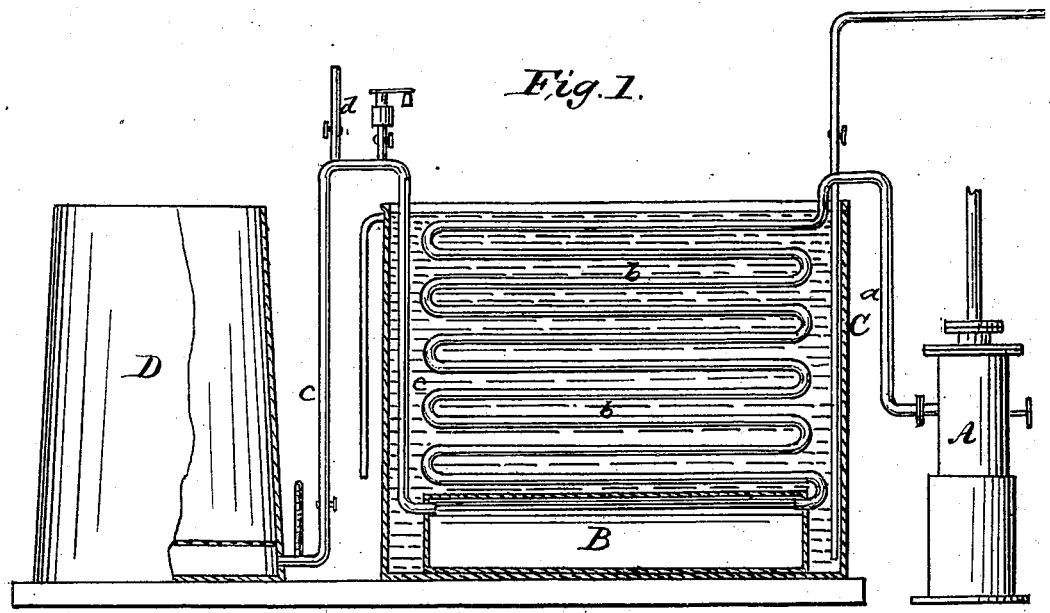
Figure 1 represents a longitudinal vertical section of this invention.
Figure 2:
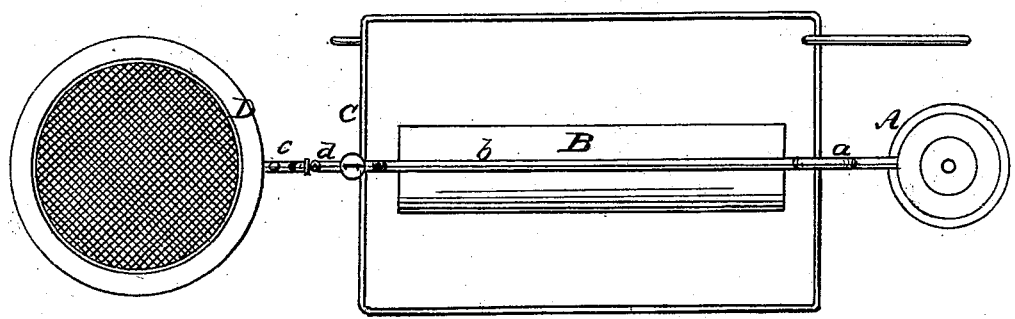
Figure 2 is a plan or top view of the same.

This invention consists in the arrangement of an air-pump, or other suitable device, capable to compress air, in combination with one or more reservoirs, which are submerged in a tank filled with cold water, or other suitable cooling medium, and from which the compressed air can be made to escape in one or more jets in the liquid to be cooled, in such a manner that by the action of the expanding air the temperature of the liquid with which the same is brought in contact is lowered, and a refrigerator is obtained which enables brewers and distillers to carry on their operations independent of the season, or of the temperature of the atmosphere.

A represents an air-pump, which connects by a pipe, $a$, and one or more coils $b$ with one or more reservoirs B. The coils $b$ and reservoirs B are submerged in cold water or other cooling liquid contained in a tank, C, through which, in practice, a stream of cold water will be made to pass as long as the refrigerator is in use. The air, which by the art of being compressed has a tendency to heat, is deprived of its caloric by the cooling medium in the tank C, and when said air is allowed to escape through the escape pipe $c$, it takes up some caloric from all the bodies with which it comes in contact, and thereby a cooling effect is produced. The escape pipe $c$ is made to pass into a still, D, containing wort or other liquid to be cooled, and the temperature of this liquid can be speedily brought down to the required temperature. Instead of passing the compressed air direct into the liquid, it may be passed through a coil in the still. And furthermore, by providing the escape $e$ with outlets $d$, jets of compressed air can be made to escape into the room, and the temperature in said room can be kept at such a low point that brewers or distillers are enabled to carry on their operations independent of the season, or of the temperature of the atmosphere. By these jets of compressed air, rooms, buildings, or vessels can be cooled, and an apparatus is obtained which serves as a refrigerator and as a disinfecter, and which can be used with advantage in hospitals and other places where it is desirable to keep the temperature at or below a certain point.

What we claim as new, and desire to secure by Letters Patent, is—

In combination with the fermenting-vat D, the arrangement of cooling apparatus, substantially as described, for the injection into the wort of jets of cooled air for the purpose described.

The above specification of our invention signed by us this 26th day of March, 1866.

A. H. TAIT,
              JOSEPH W. AVIS.

Witnesses:
 W. DEAN OVERELL,
 M. M. LIVINGSTON.